United States Patent
Ke et al.

(10) Patent No.: US 7,266,059 B2
(45) Date of Patent: Sep. 4, 2007

(54) METHOD FOR CALIBRATING TILT CONTROL VALUES OF A PICKUP HEAD IN REAL TIME

(75) Inventors: Shih-Hao Ke, Ta Li (TW); Chih-Hsien Kao, Hsin Chu (TW)

(73) Assignee: Mediatek Inc., Hsin Chu (TW)

( * ) Notice: Subject to any disclaimer, the term of this patent is extended or adjusted under 35 U.S.C. 154(b) by 566 days.

(21) Appl. No.: 10/915,476

(22) Filed: Aug. 11, 2004

(65) Prior Publication Data

US 2005/0036420 A1    Feb. 17, 2005

(30) Foreign Application Priority Data

Aug. 13, 2003  (TW) .............................. 92122306 A

(51) Int. Cl.
*G11B 7/00* (2006.01)
(52) U.S. Cl. .................................. 369/44.32; 369/53.19
(58) Field of Classification Search ...................... None
See application file for complete search history.

(56) References Cited

U.S. PATENT DOCUMENTS

| | | | | |
|---|---|---|---|---|
| 5,627,808 A | * | 5/1997 | Hajjar et al. | 369/44.32 |
| 5,886,496 A | * | 3/1999 | Furukawa et al. | 369/53.19 |
| 5,898,654 A | * | 4/1999 | Shimada et al. | 369/44.32 |
| 6,381,206 B1 | * | 4/2002 | Maeda | 369/53.19 |
| 6,885,621 B2 | * | 4/2005 | Ma et al. | 369/53.19 |
| 7,187,636 B2 | * | 3/2007 | Kato et al. | 369/44.32 |
| 2004/0037195 A1 | * | 2/2004 | Sasaki et al. | 369/53.19 |
| 2004/0125711 A1 | * | 7/2004 | Sato et al. | 369/44.32 |

* cited by examiner

*Primary Examiner*—Andrea Wellington
*Assistant Examiner*—Peter Vincent Agustin
(74) *Attorney, Agent, or Firm*—Birch, Stewart, Kolasch & Birch, LLP

(57) ABSTRACT

A method for calibrating tilt control values of a PUH in real time is applied to an optical disk drive and includes the steps of: creating a look-up table, the look-up table including several optical disk data/physical addresses of track zones and the corresponding tilt control values; reading tilt control values as reference values from the look-up table corresponding the track position of a PUH; calculating a current tilt control value according to the reference values; controlling the PUH according to the current tilt control value; reading a decoding error generated during a decoding procedure of the optical disk drive; calibrating the tilt control values and updating the look-up table. When the decoding error is larger than a decoding error threshold, the tilt control values of the track zone is calibrated. Hence, even an irregularly deformed optical disk can be calibrated to obtain better tilt control values.

9 Claims, 4 Drawing Sheets

US 7,266,059 B2

METHOD FOR CALIBRATING TILT CONTROL VALUES OF A PICKUP HEAD IN REAL TIME

This application claims the benefit of the filing date of Taiwan Application Ser. No. 092122306, filed on Aug. 13, 2003, the content of which is incorporated herein by reference.

BACKGROUND

The invention relates to a pickup head (hereinafter referred as PUH) tilt control method, and more particular to a PUH tilt control method for calibrating the tilt control value in real time.

FIGS. 1A to 1E are schematic illustrations showing the relative relationships between the optical disk, PUH, and spindle motor.

FIG. 1A shows the schematic illustration that the optical disk is not curved and perpendicular to the laser beam of the PUH. That is, the optical disk 11A is not curved and perpendicular to the laser beam of the PUH 12A. In this ideal state, the optical disk drive (not shown) can read the data all over the optical disk 11A without additionally controlling the tilt angle of the PUH 12A.

FIG. 1B shows the schematic illustration that the optical disk is not curved and is disposed horizontally but the laser beam of the PUH 12B is not perpendicular to the optical disk 11B. In this state, the optical disk drive only has to calibrate the PUH tilt once when the optical disk 11B is placed into the optical disk drive, and then the same calibration value is used to control the tilt of the PUH 12B to read the data all over the optical disk 11B.

FIG. 1C shows the schematic illustration that an optical disk tray is not perpendicular to the laser beam of the PUH. That is, the optical disk tray 13C is not perpendicular to the PUH 12C. Therefore, the laser beam is also not perpendicular to the optical disk 11C. In this state, the optical disk drive only also has to calibrate the PUH tilt once after the optical disk 11C is placed into the optical disk drive, and then the same calibration value is used to control the tilt of the PUH 12C to read the data all over the optical disk 11C.

FIG. 1D shows the schematic illustration that the outer side of the optical disk is curved. That is, the optical disk 11D is bent into a monotone curve such that the relative angle between the laser beam of the PUH 12D and the optical disk 11D is not fixed but ascends or descends with the position. In this state, the optical disk drive can calibrate the PUH tilts at the inner track and outer track when the optical disk 11D is placed into the optical disk drive. Then, the interpolation method or other methods may be used to calculate the tilt control values of other tracks according to the tilt control values of the inner and outer tracks. Thus, the PUH tilt may be controlled using the calculated tilt control values in different tracks so that the data all over the optical disk 11D may be read.

FIG. 1E shows a state of an irregularly deformed optical disk, wherein the relative angle between the laser beam of the PUH 12E and the optical disk 11E is not fixed and has no fixed rule. In addition, because the calibrating tilt control value consumed much of time for one position and the time of starting process after a optical disk is placed into the optical disk drive is restricted within a predetermined time, the tilt control values of too-many positions cannot be calibrated at the starting process. Typically, only the tilt control values of the inner and outer tracks are calibrated.

Thus, in the state of FIG. 1E, the optical disk drive cannot utilize the conventional method to control the tilt angle of the PUH. So, the data of the optical disk drive cannot be correctly acquired when the optical disk is retrieved.

SUMMARY OF THE INVENTION

In view of the above-mentioned problems, an object of the invention is to provide a method for calibrating a tilt control value of a PUH in real time, wherein a look-up table is used to store the tilt control values of a plurality of track zones, and the tilt control values of the track zone are calibrated when a decoding error exceeds a decoding error threshold.

To achieve the above-mentioned object, the PUH tilt control method of the invention includes the steps of: creating a look-up table, the look-up table storing several optical disk data/physical addresses of track zones and the corresponding tilt control values; setting a decoding error threshold; reading the tilt control values corresponding the track zone according to a PUH position from the look-up table; calculating a current tilt control value; controlling a PUH tilt according to the current tilt control value; reading a decoding error generated during a decoding procedure of the optical disk drive; and calibrating the tilt control values in the look-up table. When the decoding error is greater than the decoding error threshold, the tilt control values of the track zone are calibrated and the look-up table is updated.

Hence, even an irregularly deformed optical disk is placed in the optical disk drive, it also can be calibrated to obtain the better tilt control values according to the PUH tilt control method.

DETAILED DESCRIPTION

The PUH tilt control method of the invention for calibrating the tilt control value in real time will be described with reference to the accompanying drawings.

Because the tilt control values at different tracks for the irregularly deformed optical disk cannot be simply calculated according to the tilt control values of two or three tracks, the PUH tilt control method of the invention divides the optical disk into several track zones, utilizes the decoding error as the reference value for determining whether the tilt control values at each track zone have to be calibrated, and obtains the better tilt control values by way of fine tuning without influencing the data reading.

Figure 1A:
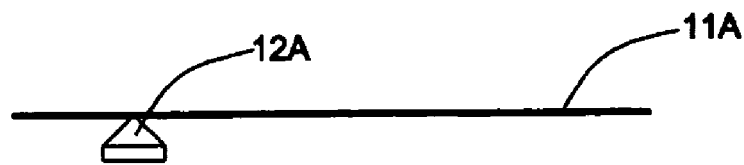
FIG. 1A shows the schematic illustration that the optical disk is not curved and perpendicular to the laser beam of the PUH.
Figure 1B:
FIG. 1B shows the schematic illustration that the optical disk is not curved and disposed horizontally but the laser beam of the PUH is not perpendicular to the optical disk.
Figure 1C:
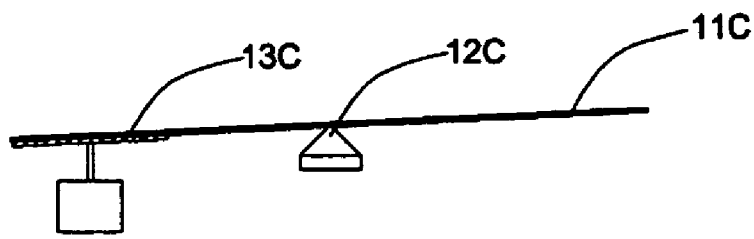
FIG. 1C shows the schematic illustration that an optical disk tray is not perpendicular to the laser beam of the PUH.
Figure 1D:
FIG. 1D shows the schematic illustration that the outer side of the optical disk is curved.
Figure 1E:
FIG. 1E shows the schematic illustration that the optical disk is irregularly deformed.
Figure 2:
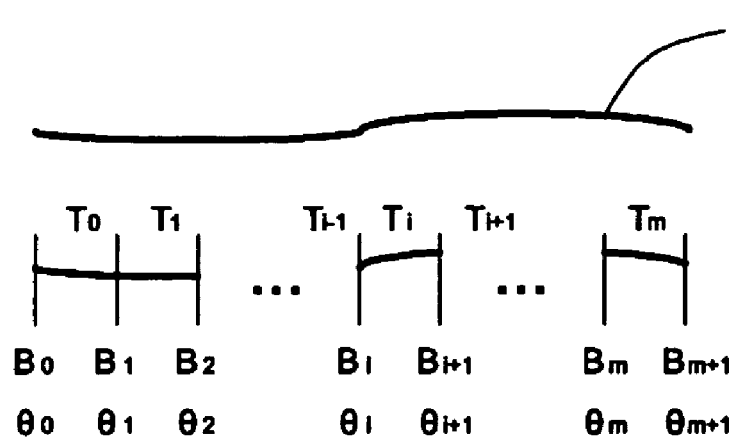
FIG. 2 shows a schematic illustration of the invention for dividing an optical disk into several track zones.

Because the optical disk would not be deformed too intensive, as shown in FIG. 2, the optical disk can be divided into several track zones $T_0$ to $T_m$, which shape may be regarded as a two-order curve. Consequently, the data/physical addresses at two ends of the track zone $T_0$ are defined as $B_0$ and $B_1$, and the tilt control values are defined as $\theta_0$ and $\theta_1$. The data/physical addresses at two ends of the track zone $T_1$ are defined as $B_1$ and $B_2$, and the tilt control values are defined as $\theta_1$ and $\theta_2$. Consequently, the tilt control value of each track in the track zone $T_0$ may be calculated according to the data/physical addresses $B_0$ and $B_1$ and the tilt control values $\theta_0$ and $\theta_1$. The tilt control value of each track in the track zone $T_1$ may be calculated according to the data/physical addresses $B_1$ and $B_2$ and the tilt control values $\theta_1$ and $\theta_2$. So, the data or physical address of each track zone and its corresponding tilt control values may be stored in a look-up table, so that a better tilt control value for controlling the PUH tilt may be calculated according to the position of the PUH and the look-up table when the optical disk drive is reading data.

In general, the optical disk drive includes a cross-interleaving Reed-Solomon code (hereinafter referred to as CIRC) calibrating unit for calibrating the error data. The CIRC calibrating unit generates a decoding error (DE) in responsive to the current degree of the decoding error. Consequently, as long as the decoding error is within an effective range, the CIRC calibrating unit can calibrate the correct data, so the optical disk drive can provide the correct optical disk data. However, when the decoding error DE exceeds the effective range, the CIRC calibrating unit cannot calibrate the correct data. In addition, as the PUH tilt deviates from the correct angle much greater, the decoding error DE also becomes much higher. Hence, the decoding error may serve as a reference value for determining whether the tilt control values have to be corrected.

When the optical disk drive is retrieving the data on the optical disk, the reading mechanism of the optical disk drive is free from being influenced if the PUH tilt is slight adjusted (e.g., adjusted with one leftward unit or rightward unit). Consequently, if the decoding error DE of the CIRC calibrating unit is higher than a decoding error threshold Eth, it means that the PUH tilt of the optical disk drive may be incorrect and thus influence the correctness of the retrieved data. At this time, the optical disk drive utilizes the control method of the invention for calibrating the tilt control values of the track zone in real time. Of course, the decoding error threshold Eth is within the effective decoding error range, so even if the decoding error DE is slightly higher than the decoding error threshold Eth, the CIRC calibrating unit also can calibrate the correct data.

Figure 3:
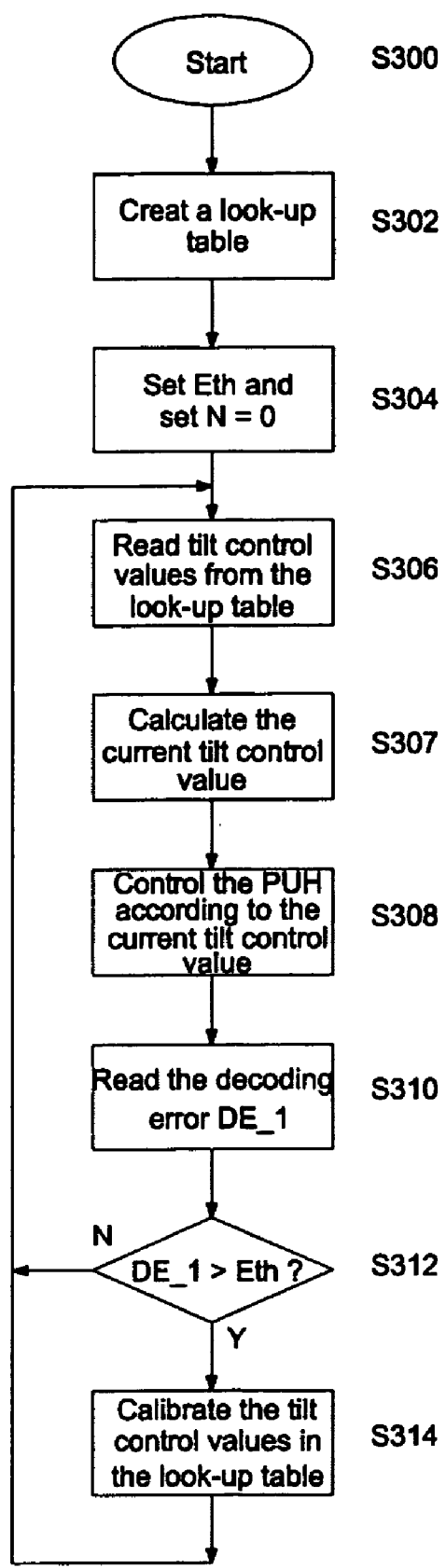
FIG. 3 shows a flow chart of the invention for real time calibrating the tilt control value of a PUH.

FIG. 3 shows a flow chart of the invention for calibrating the tilt control value of a PUH in real time. As shown in the drawing, the PUH tilt control method of the invention for calibrating the tilt control value in real time includes the following steps.

Step S300: Start.

Step S302: Create a look-up table. The look-up table stores the tilt control values of each track zone and its corresponding data or physical addresses. The initial values of the look-up table may be generated by way of interpolation according to the tilt control values of the inner and outer tracks. The tilt control values of the inner and outer tracks may be generated by way of calibration in advance when the optical disk is placed into the optical disk drive.

Step S304: Set a decoding error threshold Eth and set the count value N to 0. Because the PUH tilt influences the signal intensity read from the optical disk by the optical disk drive, the PUH tilt has the deviation when the decoding error DE of the CIRC calibrating unit exceeds a decoding error threshold Eth. Hence, the invention utilizes the decoding error DE to determine whether the tilt control values have to be calibrated in real time. The decoding error threshold Eth may be set too high, so the count value N is for counting the number of times when the tilt calibration value is not changed as the calibrating function is enabled, and the count value may serve as the reference for changing the decoding error threshold Eth.

Step S306: Read the tilt control values from the look-up table according to track address as reference tilt control values. When the optical disk drive is reading data or seeking tracks, the data or physical address of target track is got previously. Thus, the method reads the corresponding tilt control values from the look-up table according to the data or physical address as the reference tilt control values.

Step S307: Calculate a current tilt control value according to the target address and reference tilt control values.

Step S308: Control the PUH according to the current tilt control value.

Step S310: Read the decoding error DE_1. In the process when the optical disk drive retrieves the data, the optical disk drive continuously reads the decoding error DE_1 from the CIRC calibrating unit.

Step S312: Compare the decoding error DE_1 to the decoding error threshold Eth. When the decoding error DE_1 is smaller than the decoding error threshold Eth, it means that the current tilt control value does not influence the retrieved data too much, so the process jumps back to step S306. When the decoding error DE_1 is larger than the decoding error threshold Eth, it means that the current tilt control value may greatly influence the retrieved data, so the process jumps to step S314 for performing the step of calibrating the tilt control values in real time.

Step S314: Calibrate the tilt control values and update the look-up table. That is, the drive adjusts the current tilt control value with a basic unit and control the PUH using the adjusted tilt control value. The tilt control values of the track zone are calibrated without influencing the data retrieving state of the optical disk drive. Then, the process jumps back to step S306.

The optical disk drive cannot occupy too much time for calibrating the tilt control values of several track zones at the initial state when the optical disk is placed into the optical disk drive, and only the tilt control values of the inner and outer tracks can be calibrated in general. So, it is possible to cause the data reading erroneously as long as the irregularly deformed optical disk is read. However, as shown in FIG. 3, the PUH tilt control method of the invention can continuously learn and update better tilt control values, and control the decoding error DE of the CIRC calibrating unit in each track zone to be within the decoding error threshold Eth such that the CIRC calibrating unit can operate normally.

Figure 4:
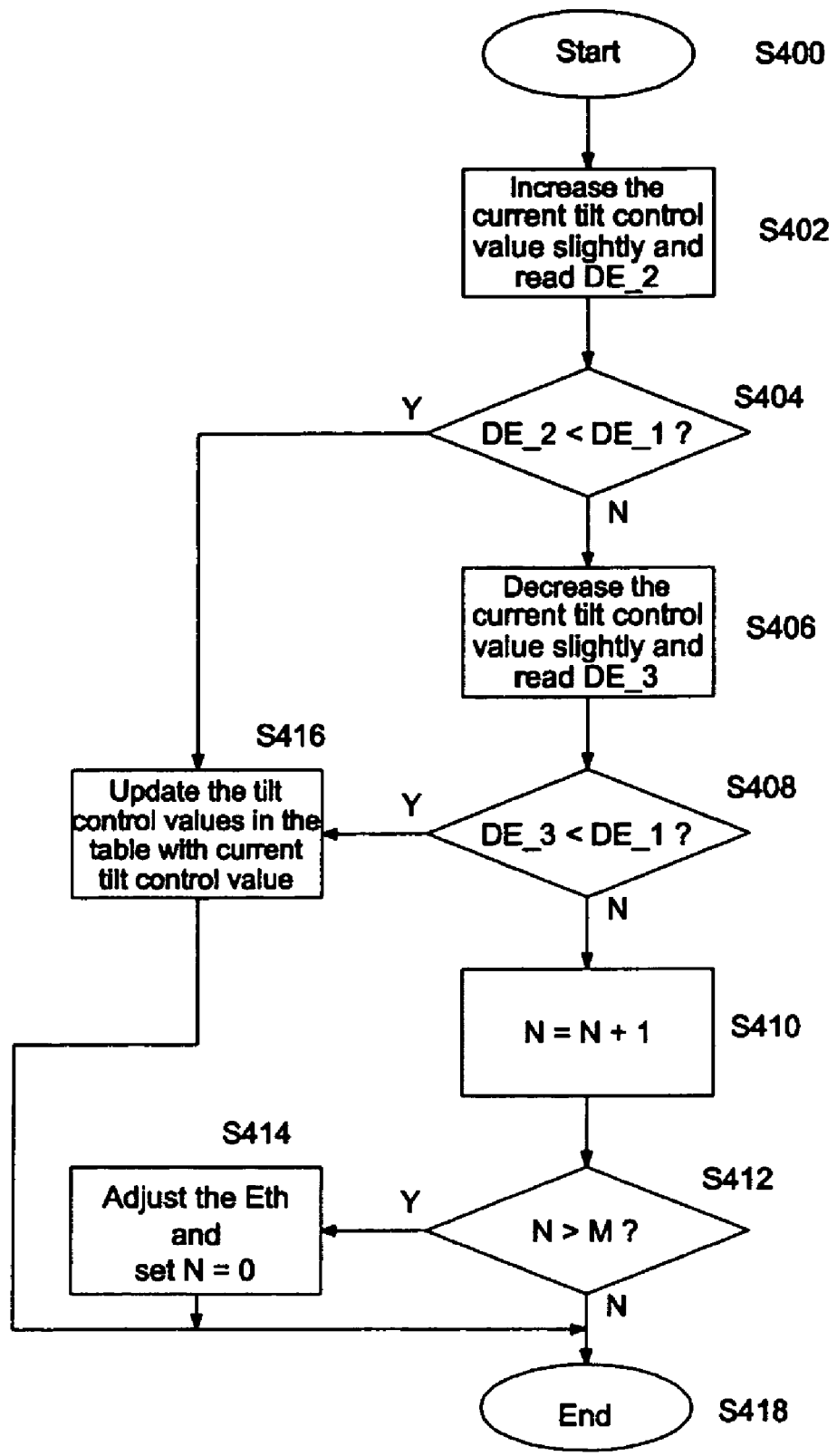
FIG. 4 shows a flow chart of the invention for real time calibrating the tilt control value look-up table.

FIG. 4 shows a flow chart of the invention for calibrating the tilt control values in real time and updating the look-up table. The method of the invention for calibrating the tilt control values in real time is to bias the PUH by a little distance (may be a minimum moving unit) toward two sides when the optical disk drive is retrieving the optical disk data, and to judge the tilt control value in which direction is better according to decoding error DE. That is, the method updates the tilt control values in the look-up table according to the tilt control value with smaller decoding error DE. As shown in the drawing, the method of the invention for calibrating the tilt control values in real time includes the following steps.

Step S400: Start.

Step S402: Increase the current tilt control value slightly and read the decoding error DE_2 of the CIRC calibrating unit.

Step S404: Compare the decoding error DE_1 to the decoding error DE_2. When the decoding error DE_2 is smaller than the decoding error DE_1, it means that the newly adjusted tilt control value is better than the original tilt control value in the look-up table, and the process jumps to step S416. When the decoding error DE_2 is larger than DE_1, it means that the newly adjusted tilt control value is worse than the original tilt control value in the look-up table, and the process jumps to step S406.

Step S406: Decrease the current tilt control value slightly and read the decoding error DE_3 of the CIRC calibrating unit.

Step S408: Compare the decoding error DE_1 to the decoding error DE_3. When the decoding error DE_3 is smaller than the decoding error DE_1, it means that the newly adjusted tilt control value is better than the original tilt control value in the look-up table, and the process jumps to step S414. When the decoding error DE_3 is larger than DE_1, it means that the newly adjusted tilt control value is worse than the original tilt control value in the look-up table, and the process jumps to step S410.

Step S410: Control the PUH with the original tilt control value that is not adjusted and adding one to the count value N.

Step S412: Determine whether the count value N is larger than a comparison value M. If the count value N is larger than the comparison value M, it means that the decoding error threshold Eth is set too low, and the process jumps to step S414; or otherwise to step S418.

Step S414: Adjust the decoding error threshold Eth, and reset the count value N to 0, and then the process jumps to step S418.

Step S416: Update the look-up table according to the adjusted tilt control value. Because the decoding error caused by the adjusted tilt control value is lower, the tilt control values of the track zone in the look-up table are updated according to the adjusted tilt control value.

Step S418: End.

According to the above-mentioned method for calibrating the tilt control values in real time, the optical disk drive can calibrate the tilt control values for each track zone when the optical disk data is retrieved. Thus, the tilt control values for the track zones are the better control values, and the CIRC calibrating unit still can calibrate the correct data without being influenced by the poor tilt control values. In the above flowchart, firstly, the method is to increase the current tilt control value slightly in the step S402, and then to decrease the current tilt control value slightly in the step S406. Alternately, the method can increase the current tilt control value slightly firstly in the step S402, and then decrease the current tilt control value slightly in the step S406.

The method for updating the look-up table according to the adjusted tilt control value in the above-mentioned step S416 will be described in the following. It is assumed that the tilt control values in the look-up table are $\theta_1$ and $\theta_{i+1}$, the current tilt control value calculated is $\theta_c$, the adjusted tilt control value is $\theta_n$, and the variation of the tilt control value is $\Delta\theta$. The new tilt control values in the look-up table are $\theta_i = \theta_i - \mu_i \beta_{opt} \Delta\theta$ and $\theta_{i+1} = \theta_{i+1} - \mu_{i+1} \beta_{opt} \Delta\theta$. Of course, this updating method is only an embodiment, and other updating methods also can be used in the invention.

Figure 5:
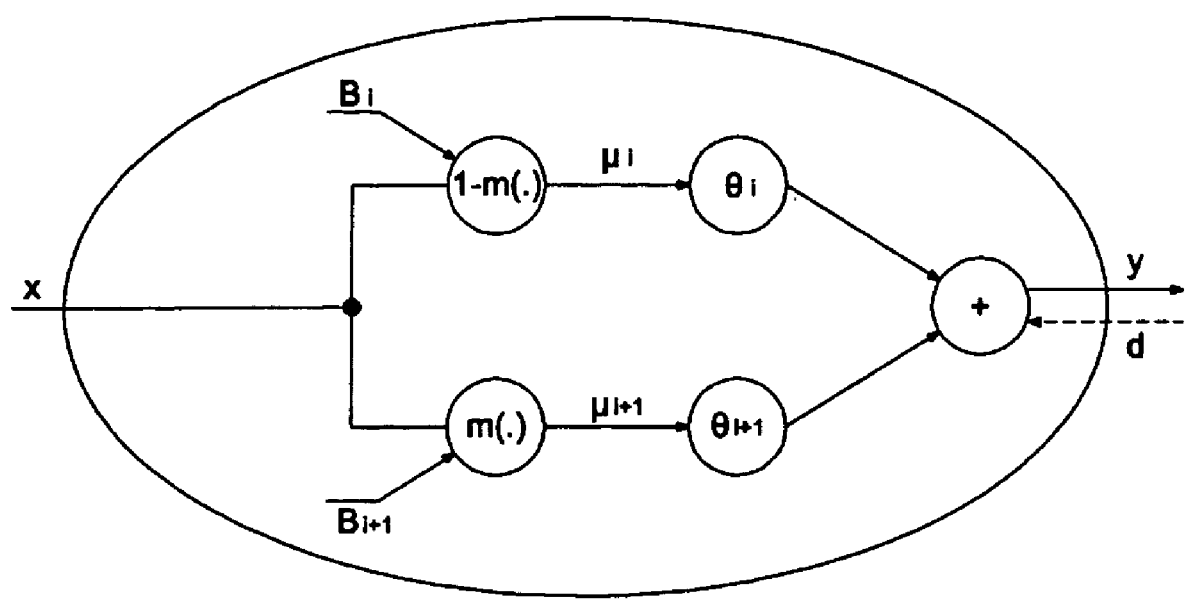
FIG. 5 shows an embodiment in which the actual tilt control value is generated from the look-up table using the artificial neural network according to the actual address of the PUH.

FIG. 5 shows an embodiment in which the current tilt control value is generated from the look-up table using the artificial neural network according to the actual address of the PUH. As shown in this drawing, the function of the artificial neural network corresponds to the linear interpolation operation, and its output tilt control value may be calculated according to the following equations:

$$m(.) = \frac{x - B_i}{B_{i+1} - B_i} \quad (1)$$

$$\mu_i = 1 - m(x) \quad (2)$$

$$\mu_{i+1} = m(x) \quad (3)$$

$$y = \mu_i \theta_i + \mu_{i+1} \theta_{i+1} \quad (5)$$

$$\beta_{opt} = \frac{1}{(\mu_i^2 + \mu_{i+1}^2)} \quad (5)$$

wherein x is the current track address of the PUH, $B_i$ is the starting track address of the track zone, $B_{i+1}$ is the ending track address of the track zone, $\theta_i$ is the tilt control value of the starting track address of the track zone, $\beta_{opt}$ is the optimum learning converging coefficient, and $\theta_{i+1}$ is the tilt control value of the ending track address of the track zone. Consequently, as long as the current track address x of the PUH is inputted, a corresponding current tilt control value may be outputted. Thus, step S306 can calculate the current tilt control value according to the artificial neural network of FIG. 5.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A method for calibrating tilt control values of a PUH in real time, the method being applied to an optical disk drive and comprising the steps of:

creating a look-up table, which comprises optical disk data/physical addresses of a plurality of track zones and their corresponding tilt control values;

reading tilt control values as the reference values from the look-up table according to the track position of the PUH;

calculating a current tilt control value according to the reference values;

controlling a PUH tilt according to the current tilt control value;

reading a first decoding error generated in a decoding process of the optical disk drive; and calibrating the tilt control values, in which the tilt control values corresponding to the track zone are calibrated and updated into the look-up table when the first decoding error is larger than a decoding error threshold.

2. The method according to claim 1, wherein the step of reading the tilt control values is to read the tilt control values at two sides of the track zone corresponding to the track address of the PUH.

3. The method according to claim 1, wherein the step of calculating a current tilt control value is to calculate the current tilt control value by way of interpolation according to the reference values.

4. The method according to claim 1, wherein in the step of calculating a current tilt control value, the current tilt control value is calculated by the following equations:

$$m(.) = \frac{x - B_i}{B_{i+1} - B_i},$$

$\mu_i = 1 - m(x)$, $\mu_{i+1} = m(x)$, and $y = \mu_i \theta_i(t) + \mu_{i+1} \theta_{i+1}(t)$, wherein x is the track address of the PUH, $B_i$ is a starting track address of the track zone, $B_{i+1}$ is an ending track address of the track zone, $\theta_i(t)$ is the tilt control value of the starting track address of the track zone in the look-up table, $\theta_{i+1}(t)$ is the tilt control value of the ending track address of the track zone in the look-up table, and y is the current tilt control value.

5. The method according to claim 4, wherein in the step of calibrating the tilt control values, the updated tilt control values are $\theta_i(t+1) = \theta_i(t) - \mu_i \beta_{opt} \Delta\theta$ and $\theta_{i+1}(t+1) = \theta_{i+1}(t) - \mu_{i+1} \beta_{opt} \Delta\theta$, and the $\beta_{opt}$ is an optimum learning converging coefficient and defined as $$\beta_{opt} = \frac{1}{(\mu_i^2 + \mu_{i+1}^2)}.$$

6. The method according to claim 1, wherein the step of creating a look-up table comprises the steps of:

calibrating the tilt control value of an inner track;
calibrating the tilt control value of an outer track; and
calculating the tilt control value of the track zones by way of interpolation according to the tilt control values of the inner and outer tracks.

7. The method according to claim 1, wherein the decoding error is generated from a cross-interleaving Reed-Solomon code calibration unit of the optical disk drive.

8. The method according to claim 7, wherein the step of calibrating the tilt control values comprises the steps of:

increasing the current tilt control value slightly;
controlling the PUH using the new current tilt control value;
reading a second decoding error generated during the decoding process of the optical disk drive;
updating the tilt control value of the track zone in the look-up table according to the new current tilt control value and ending the step of calibrating the look-up table when the second decoding error is smaller than the first decoding error;
decreasing the current tilt control value slightly when the second decoding error is greater than the first decoding error;
controlling the PUH using the new current tilt control value;
reading a third decoding error caused in the decoding process of the optical disk drive;
updating the tilt control value of the track zone in the look-up table according to the new current tilt control value, and ending the step of calibrating the look-up table when the third decoding error is smaller than the first decoding error; and
adding a count value by 1 and ending the step of calibrating the look-up table when the second decoding error is also greater than the first decoding error.

9. The method according to claim 8, wherein when the count value exceeds a predefined value, the decoding error threshold is adjusted and the count value is reset to 0.

* * * * *